(12) United States Patent
Han et al.

(10) Patent No.: US 8,310,977 B2
(45) Date of Patent: Nov. 13, 2012

(54) WIRELESS REPEATER AND OPERATING METHOD OF THE SAME

(75) Inventors: Jeong-Hun Han, Seoul (KR); Yeong-Baek Kim, Seoul (KR)

(73) Assignee: S1 Corporation, Seoul (KR)

( * ) Notice: Subject to any disclaimer, the term of this patent is extended or adjusted under 35 U.S.C. 154(b) by 1162 days.

(21) Appl. No.: 11/954,634

(22) Filed: Dec. 12, 2007

(65) Prior Publication Data

US 2009/0003258 A1 Jan. 1, 2009

(30) Foreign Application Priority Data

Jun. 27, 2007 (KR) .................. 10-2007-0063703

(51) Int. Cl.
*H04B 7/14* (2006.01)
*H04B 7/00* (2006.01)
*H04B 3/36* (2006.01)
(52) U.S. Cl. .............................. 370/315; 370/310; 455/7
(58) Field of Classification Search .................... 370/315
See application file for complete search history.

(56) References Cited

U.S. PATENT DOCUMENTS

| 7,734,249 | B1 * | 6/2010 | Mitchell et al. | 455/11.1 |
| 2006/0153154 | A1 | 7/2006 | Yoon et al. | |
| 2009/0279558 | A1 * | 11/2009 | Davis et al. | 370/412 |

FOREIGN PATENT DOCUMENTS

| JP | 08-149152 A | 6/1996 |
| JP | 2006-325069 A | 11/2006 |
| KR | 10-2002-0079796 A | 10/2002 |
| KR | 10-2005-0010951 A | 1/2005 |
| KR | 10-2006-0076418 A | 7/2006 |
| KR | 10-2006-0098505 A | 9/2006 |
| KR | 10-2007-0031845 A | 3/2007 |
| WO | 2004/002014 A1 | 12/2003 |
| WO | 2005/043446 A2 | 5/2005 |

* cited by examiner

*Primary Examiner* — Derrick Ferris
*Assistant Examiner* — Shripal Khajuria
(74) *Attorney, Agent, or Firm* — Knobbe Martens Olson & Bear, LLP

(57) ABSTRACT

A repeater for relaying data signals between two nodes is provided. The repeater includes a first signal processor that amplifies the received data signals, a path controller that transmits initial information of the received data signal through a first path to determine if the received data signal is from a specific local area and transmits data signals following the initial information through a second path to amplify the data signals following the initial information, a second signal processor that amplifies and transmits the data signal, and a data selection processor that allows the data signals following the initial information to be transmitted through the second path when it is determined using the initial information received that the received data signal is from the specific local area.

14 Claims, 9 Drawing Sheets

WIRELESS REPEATER AND OPERATING METHOD OF THE SAME

CROSS-REFERENCE TO RELATED APPLICATION

This application claims priority to and the benefit of Korean Patent Application No. 10-2007-0063703 filed in the Korean Intellectual Property Office on Jun. 27, 2007, the disclosure of which are incorporated herein by reference in its entirety.

BACKGROUND

1. Field

The present disclosure relates to a wireless data transmission system, and more particularly, to a repeater for relaying data signals in a sensor network and a relaying method of the same.

2. Discussion of the Related Technology

As wireless communication technology is developing, an information communication environment where a user can access a communication network regardless where they are has been created. Particularly, development of local wireless communication technology makes it possible for a variety of service technologies, such as intelligent home network services, automation services of industrial devices for buildings, environmental monitoring services, military communication services, telematics services, and security services, to be applied in our everyday lives.

Recently, a user can use a variety of remote services such as remote sensing, remote surveillance, and remote control services through a sensor network using the local wireless communication technology. The sensor network includes at least one sink node and a plurality of sensor nodes for transmitting detected data to the corresponding sink nodes that are responsible for the areas where the sensor nodes are placed. At this point, the sensor nodes collect information (e.g., temperature, humidity, movement of objects, and gas leakage) on target areas set by the user and transmit the information to the sink node.

Meanwhile, among the sensor nodes, the sensor nodes located within a predetermined distance from the sink node can directly transmit the data to the sink node. However, the sensor nodes that are not located within the predetermined distance have to transmit the data through a repeater.

Generally, in the sensor network, the repeater receives frame-based data from the sensor nodes and transmits the data to the sink node after amplifying the data. At this point, according to an exemplary data signal relaying method of the repeater, the repeater selects the data that is identified as data received from the sensor nodes placed at specific local areas set by the user, amplifies only the selected data, and transmits the amplified data.

In order to select the data, the repeater retrieves an identifier representing that the data is received from the sensor node of the specific local area after receiving a complete frame of a data signal. However, when using this data selection method, data transmission delay occurs and thus data distortion occurs due to the interference between the receiving data and the transmission data. In addition, when relaying the data of the sensor nodes, a time error between data occurs and thus a data overlapping phenomenon may occur.

The above information disclosed in this Background section is only for enhancement of understanding of the general background information and therefore it may contain information that does not form the prior art that is already known in this country to a person of ordinary skill in the art.

SUMMARY

One aspect of the invention provides a wireless repeater for relaying data between two nodes of a sensor network, which comprises: a first signal processor configured to amplify received data, which comprise a leading portion and a subsequent portion subsequent to the leading portion in the data; a path controller configured to route the leading portion to a data selection processor and further configured to route the subsequent portion to a second signal processor in response to a command from the data selection processor; said second signal processor configured to amplify the subsequent portion for wireless transmission; and said data selection processor configured to analyze the leading portion so as to determine whether the repeater is responsible for retransmitting the received data, wherein the data selection processor is further configured to send the command to the path controller if it is determined that the repeater is responsible.

In the foregoing repeater, the path controller may comprise a switching controller configured to detect the leading portion comprising source information indicative of a source of the data, and further configured to detect the subsequent portion lacking the source information, and a switch configured to switch between the data selection processor and the second signal processor for routing the leading portion and the subsequent portion in accordance with detection by the switching controller. The data selection processor may comprise an analyzer configured to identify the source information, a processor configured to determine whether the repeater may be responsible for retransmitting the data using the source information, and further configured to transmit the command to the path controller, and a memory configured to store at least one predetermined legitimate source of data for which the repeater is responsible for retransmitting, wherein the processor may be further configured to use the at least one predetermined legitimate source for determining that the repeater is responsible for retransmitting the data.

Still in the foregoing repeater, the switch may be configured to route the leading portion to the analyzer, and the switch may be further configured to route the subsequent portion to the second signal processor. The data may be in the form of a frame and the leading portion may be a header of the frame. The data may be in the form of a frame, and the leading portion may comprise a path control signal. The path control signal may comprise the source information and information indicative of a length of the subsequent portion. The router may be further configured to route at least one frame of data following the path control signal to the second signal processor.

Another aspect of the invention provides a method of operating a repeater for relaying data between two nodes of a sensor network, which comprises: receiving data comprising a leading portion and a subsequent portion, which is received subsequent to the leading portion, wherein the leading portion comprises source information indicative of a source of the data; detecting at least part of the leading portion; determining if the received data is received from one of predetermined legitimate sources using the source information; and amplifying the subsequent portion when it is determined that the received data is from one of the predetermined legitimate sources.

In the foregoing method, the leading portion may comprise a header of a frame or a path control signal. Determining may comprise: retrieving the source information contained in the header; and comparing the retrieved source information against information indicative of at least one predetermined legitimate sources, which is stored in the repeater. Determining may comprise: retrieving the source information contained in the path control signal and information indicative of a length of the subsequent portion; and comparing the retrieved source information against information indicative of at least one predetermined legitimate sources, which is stored in the repeater. Amplifying the subsequent portion may be performed for a period sufficient to amplify the length of the subsequent portion. The subsequent portion may comprise at least one frame. The information indicative of a length of the subsequent portion may be also contained in the path control signal.

Exemplary embodiments of the present invention provide a repeater and a relaying method of the same that can effectively receive and transmit data by reducing a time delay in a sensor network.

In an exemplary embodiment, a repeater for relaying data signals between at least one transmission part for collecting data of a predetermined region and a receiving part for receiving the data from the transmission part includes a first signal processor that filters and amplifies the received data signals, a path controller that transmits initial information of the received data signal through a first path to determine if the received data signal is from a specific local area and transmits data signals following the initial information through a second path to amplify the data signals following the initial information, a second signal processor that amplifies and transmits the data signal received through the second path of the path controller, and a data selection processor that allows the data signals following the initial information to be transmitted through the second path when it is determined using the initial information received through the first path of the path controller that the received data signal is from the specific local area.

In another exemplary embodiment, a relaying method of a repeater for relaying data signals between at least one transmission part for collecting data of a predetermined region and a receiving part for receiving the data from the transmission part includes detecting initial information of a received data signal, determining if the received data signal is from a specific local area using identification information contained in the initial information, and amplifying and transmitting a data signal following the initial information when the received data signal is from the specific local area.

DETAILED DESCRIPTION OF EMBODIMENTS

Figure 1:
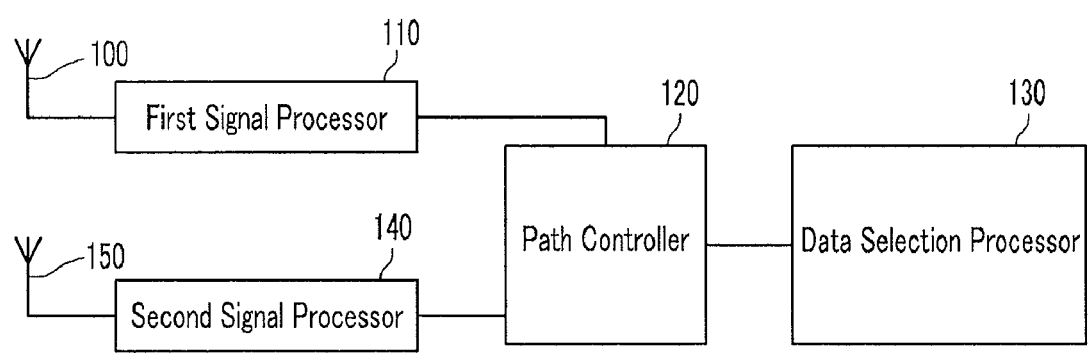
FIG. 1 is a schematic block diagram of a repeater according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

When it is described that a portion "includes" some constituent elements, this means than the portion may further include other constituent elements unless specifically referred to the contrary.

FIG. 1 is a schematic block diagram of a repeater according to an exemplary embodiment of the present invention.

Referring to FIG. 1, a repeater of a sensor network includes a first antenna 100, a first signal processor 110, a path controller 120, a data selection processor 130, a second signal processor 140, and a second antenna 150.

First, the first antenna 100 receives a data signal from a sensor node of the sensor network and transmits the data signal to the first signal processor 110. At this point, the data signal is a radio frequency (RF) signal.

The first signal processor 110 amplifies the received data signal, filters off noise contained in the data signal, and transmits the amplified, filtered data signal to the path controller 120. At this point, the signal transmitted to the path control unit 120 is an initial information portion of the received data signal, i.e., a header of a data frame or a path control signal. Here, the path control signal is generated from the sensor node and then transmitted to a front end of the data. The path control signal contains identification information of the specific local area where the sensor node is placed.

The first signal processor 110 includes an RF terminal (not shown) and an intermediate frequency (IF) terminal (not shown). Here, the RF terminal converts the RF signal frequency of the data received from the sensor down to an intermediate frequency, and the IF terminal detects frame data from the signal that is converted down to the intermediate frequency.

The path controller 120 detects the data signal transmitted from the first signal processor 110 and transmits initial information of the data signal to the data selection processor 130. Further, the path controller 120 sets a transmission path of a data signal following the initial information in accordance with a data transmission path control signal received from the data selection processor 130.

The data selection processor 130 determines if the received data signal is from the specific local area using the initial information of the received data signal. When it is determined that the received data signal is from the specific local area, the data selection processor 130 generates a signal for amplifying the data signal following the initial information and transmits the generated signal to the path controller 120.

The second signal processor 140 amplifies the data signal following the initial information transmitted through the path controller 120 and transmits the amplified data signal to the second antenna 150.

The second signal processor 140 includes an IF terminal (not shown) and an RF terminal (not shown) in a reverse direction of an internal structure of the first signal processor 110. That is, the frame data following the initial information is converted into an intermediate frequency signal through the IF terminal of the second signal processor 140. The intermediate frequency signal is converted up to the RF frequency signal through the RF terminal.

The second antenna 150 transmits the data that are signal-processed in the second signal processor 140 to the sink node.

At this point, since the internal structure of the first and second signal processors such as frequency filters and signal amplifiers in addition to the IF and RF terminals is well known in the art, a detailed description thereof will be omitted herein.

Figure 2:
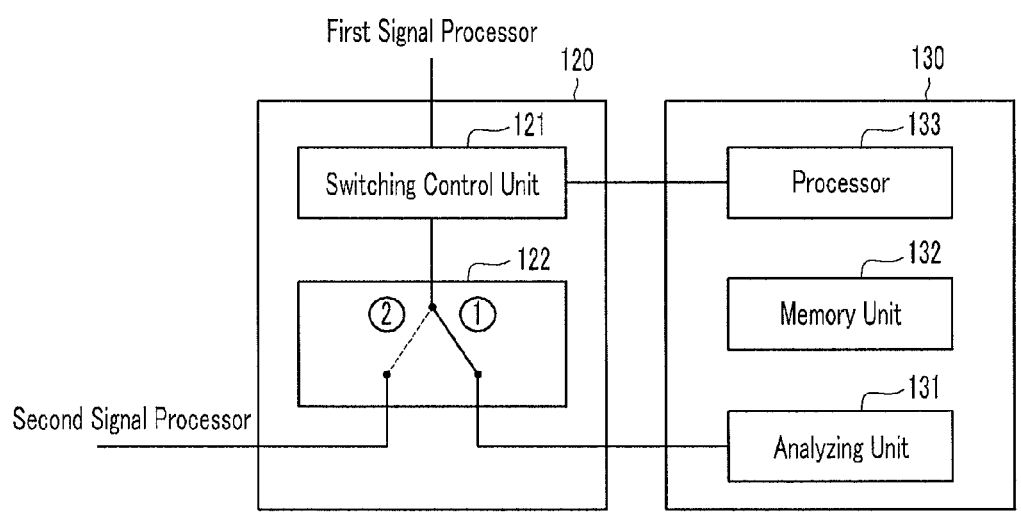
FIG. 2 is a block diagram illustrating internal structures of a path controller and a data selection processor of FIG. 1.
Figure 3A:
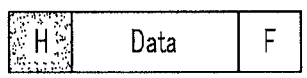
FIG. 3A is a view illustrating a frame structure of a data signal according to an exemplary embodiment of the present invention.
Figure 3B:
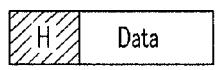
FIG. 3B is a view illustrating a frame structure of a path control signal according to an exemplary embodiment of the present invention.

FIG. 2 is a block diagram illustrating an internal structure of the path control and data selection processor of FIG. 1. FIG. 3A is a view illustrating a frame structure of a data signal according to an exemplary embodiment of the present invention, and FIG. 3B is a view illustrating a frame structure of a path control signal according to an exemplary embodiment of the present invention.

As shown in FIG. 2, the path controller 120 of an embodiment includes a switching control unit 121 and a switch 122. Further, the data selection processor 130 includes an analyzing unit 131, a memory unit 132, and a processor 133.

The switching control unit 121 of the path controller 120 detects the data transmitted from the first signal processor 110 and controls a first path ① of the switch 122 to be in an on-state. That is, when the switching control unit 121 detects the transmission of the data signal, the switch 122 opens (turns on) the first path ① so as to transmit the initial information of the received data to the analyzing unit 131 of the data selection processor 130.

Further, the switching control unit 121 receives a control signal for the switch 122 of the data selection processor 130 to transmit the data following the initial information to the second signal process unit 140 by turning on a second path ② of the switch 122.

The switch 122 functions to appoint the transmission path of the data signal received from the first signal processor 110. That is, the switch 122 transmits the initial information of the data signal to the data selection processor 130 by turning on the first path ① and transmits the data signal following the initial information of the data signal to the second signal processor 140 by turning on the second path ②. The data signal transmitted to the second signal processor 140 is amplified.

At this point, the initial information of the received data signal may be a header of the data frame or a control path signal that transmits the data signal transmitted from the sensor node to a front end of the data signal.

In more detail, the frame of the data signal, as shown in FIG. 3, includes a header H containing the data information and a frame check sequence F for checking data DATA collected by the sensor node and data error. At this point, the header H contains an identification code for identifying if the data signal received is from a specific local area.

The path control signal is a frame-based signal and, includes a header H and data DATA, as shown in FIG. 3B. At this point, the path control signal contains an identification code for identifying if the predetermined number of frame data signals received following the path control signal is the data of a specific local area. Further, the path control signal contains receiving sustain time information for transmitting the predetermined number of frame data to the second signal processor 140. In an embodiment of the present invention, a case where the receiving sustaining time information is a timing information code that is time information for turning on the second path ② of the switch 122 is proposed by way of example.

At this point, in an embodiment of the present invention, the header of the frame data and the path control signal transmitted to the front end of the data signal contain, respectively, a header identification code and a path control signal identification code.

Next, the analyzing unit 131 of the data selection processor 130 receives the initial information of the data signal from the switching control unit 121 and analyzes the identification information of the received data. In more detail, when the received initial information is the header of the frame data, the analyzing unit 131 retrieves the identification code contained in the header and transmits the retrieved code to the processor 133.

When the received initial information is the path control signal that is received in advance of the data signal containing the information collected by the sensor node, the analyzing unit 131 retrieves the identification code contained in the path control signal and the timing information code and transmits the retrieved codes to the processor 133.

At this point, the analyzing unit 131 retrieves the header identification code and the path control signal identification code and transmits the same to the processor 133.

The memory unit 132 stores an identification code for identifying if the received data is transmitted from a sensor node of a specific local area. The memory unit 132 further stores a determination code for determining if the initial information of the received data signal is the header of the frame data or the path control signal.

Further, the memory unit 132 stores the timing information code, which is contained in the initial information when the initial information of the received data is the path control signal, and the switching turn-on sustain period matching with the timing information code.

In an embodiment of the present invention, the timing information contained in the path control signal is stored in the form of a code type. However, the data receiving sustain time received following the path control signal may be contained in the path control signal. In this case, the memory unit 132 does not contain a switching turn-on sustain period matching with the timing code. At this point, the received timing code or the receiving sustain time are calculated when the data signal is transmitted from the sensor node and contained in the initial information.

Further, a timer (not shown) may be provided to maintain the turn-on state of the second path ② of the switch 122.

The processor 133 compares the identification code of the data retrieved by the analyzing unit 131 with the identification code stored in the memory unit 132 to determine if the received data signal is transmitted from the sensor node of the specific local area. At this point, the processor 133 compares the determination code stored in the memory unit 132 with the determination code retrieved from the information of the received data to determine if the initial information is the header of the frame data or the path control signal received in advance of the data signal. When it is determined that the received initial information is the path control signal, the processor 133 controls the switch 122 using the switching turn-on sustain period information matching with the timing information code.

In more detail, when it is determined that the received data is transmitted from the sensor node of the specific local area, the processor 133 transmits the control signal for turning-on the second path ② of the switch 122 to the switching control unit 121. At this point, when the initial information analyzed by the analyzing unit 131 is the path control signal, the processor 133 transmits a control signal for maintaining the turn-on state of the second path ② of the switch 122 in accordance with the switching turn-on sustain period matching with the timing code information stored in the memory unit 132.

At this point, the data selection process period for which the initial information of the data is determined through the data selection processor 130 almost concurs with the point of the data signal following the header (or the path control signal) of the data signal. Therefore, the data signal following the header (or the path control signal) can be amplified in real time.

Figure 4:
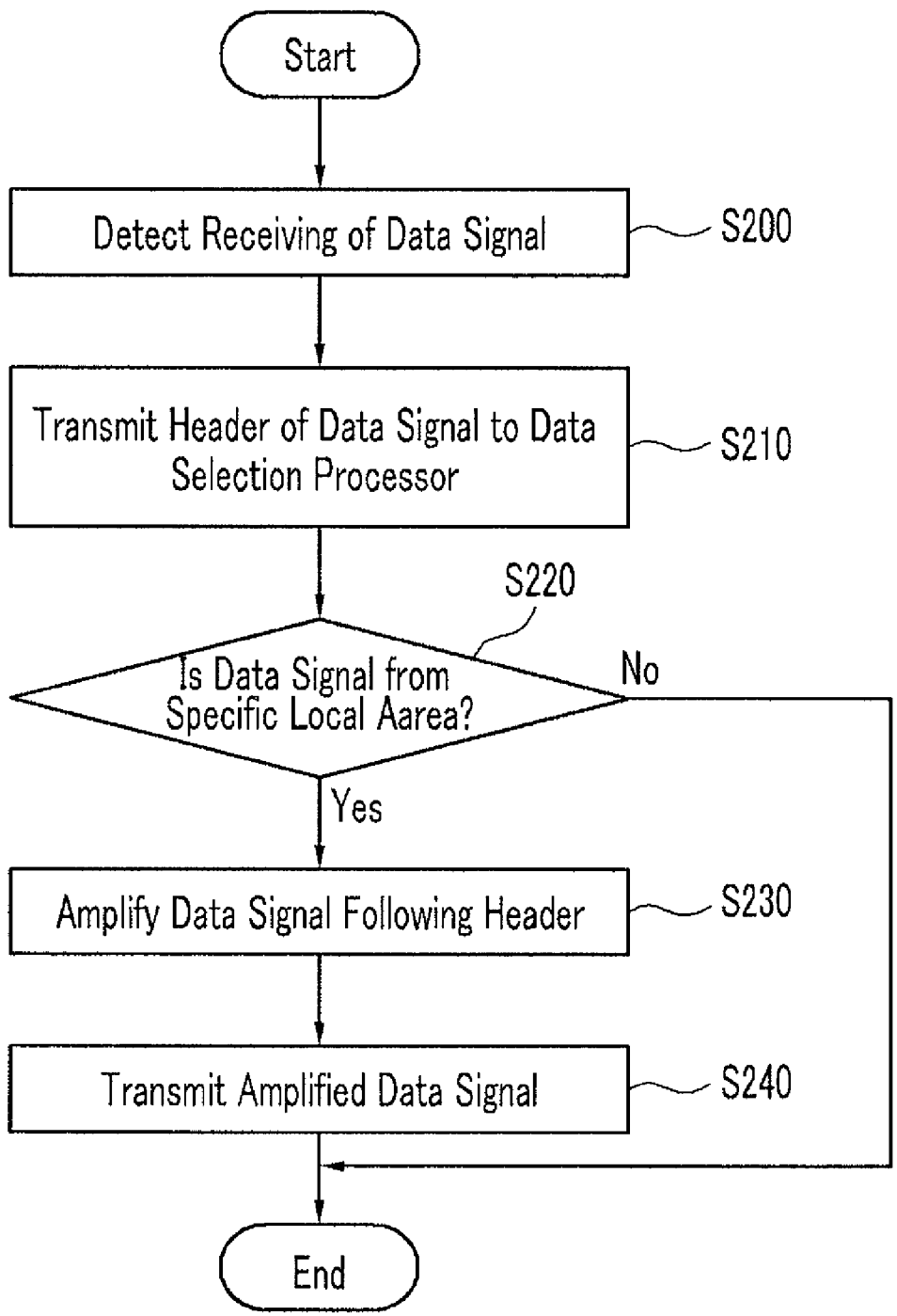
FIG. 4 is a flowchart illustrating a method for selecting and amplifying data in a repeater according to an embodiment of the present invention.
Figure 5:
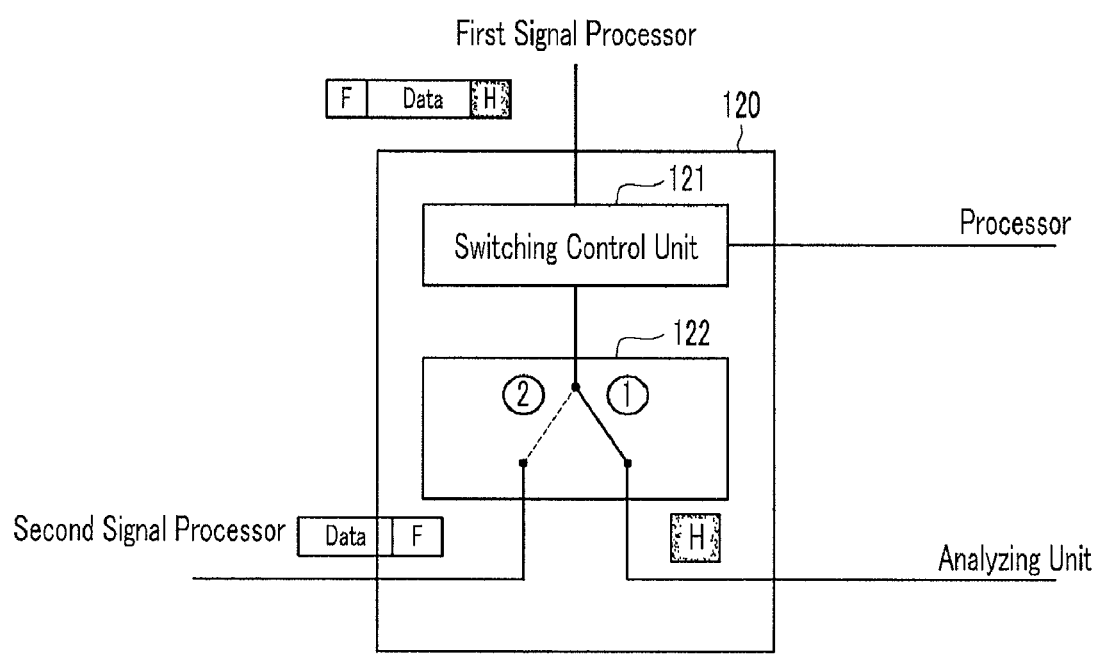
FIG. 5 is a view illustrating a method of selecting and amplifying the data in the repeater according to an embodiment of the present invention.

FIG. 4 is a flowchart illustrating a method for selecting and amplifying data in the repeater according to an embodiment of the present invention. FIG. 5 is a view illustrating a method of selecting and amplifying the data in the repeater according to an embodiment of the present invention. For convenience, FIG. 4 will be described with reference to the repeater of FIG. 2.

First, when the path controller 120 detects the data signal transmitted from the sensor node (S200), the path controller 120 transmits the header that is the initial information of the data signal to the data selection processor 130 (S210). That is, the path control unit 120 controls the first path ① of the switch 122 to the on-state and sets the received data path as the data selection processor 130.

Then, the data selection processor 130 receiving the header of the data signal determines if the received data is transmitted from the specific local area (S220). At this point, the data selection processor 130 compares the identification code contained in the header with a preset identification code to determine if the received data is from the specific local area.

When it is determined that the received data is from the specific local area, the data selection processor 130 amplifies the data signal following the header (S230). That is, the data selection processor 130 transmits a control signal for setting a path of the data following the header of the data signal as an amplification processor (a second signal processor in this exemplary embodiment) to the switching control unit 120. Then, the second path ② of the switch 122 is turned on to amplify the data following the header.

The amplified data is transmitted to the sink node (S240). At this point, the amplification of the data following the header and the determination of the identification code of the header occur almost simultaneously, and thus transmission delay can be prevented.

Meanwhile, when it is determined that the data is not from the specific local area, the data selection processor 130 quits the data signal relay.

For example, when one frame data is transmitted to the repeater, the switching control unit 121 detects this and opens the first path ① of the switch 122. Then, as shown in FIG. 5, the header of the data is transmitted to the data selection processor 130 and it is determined if the data is from the specific local area. At the same time, the second path ② of the switch 122 is turned on in accordance with the control of the switching controller 121, and thus the data signal following the header of the received data signal is transmitted to the second signal processor 140. The data signal transmitted to the second signal processor 140 is amplified.

Accordingly, the repeater can amplify the data signal of the specific local area without experiencing a time delay.

Figure 6:
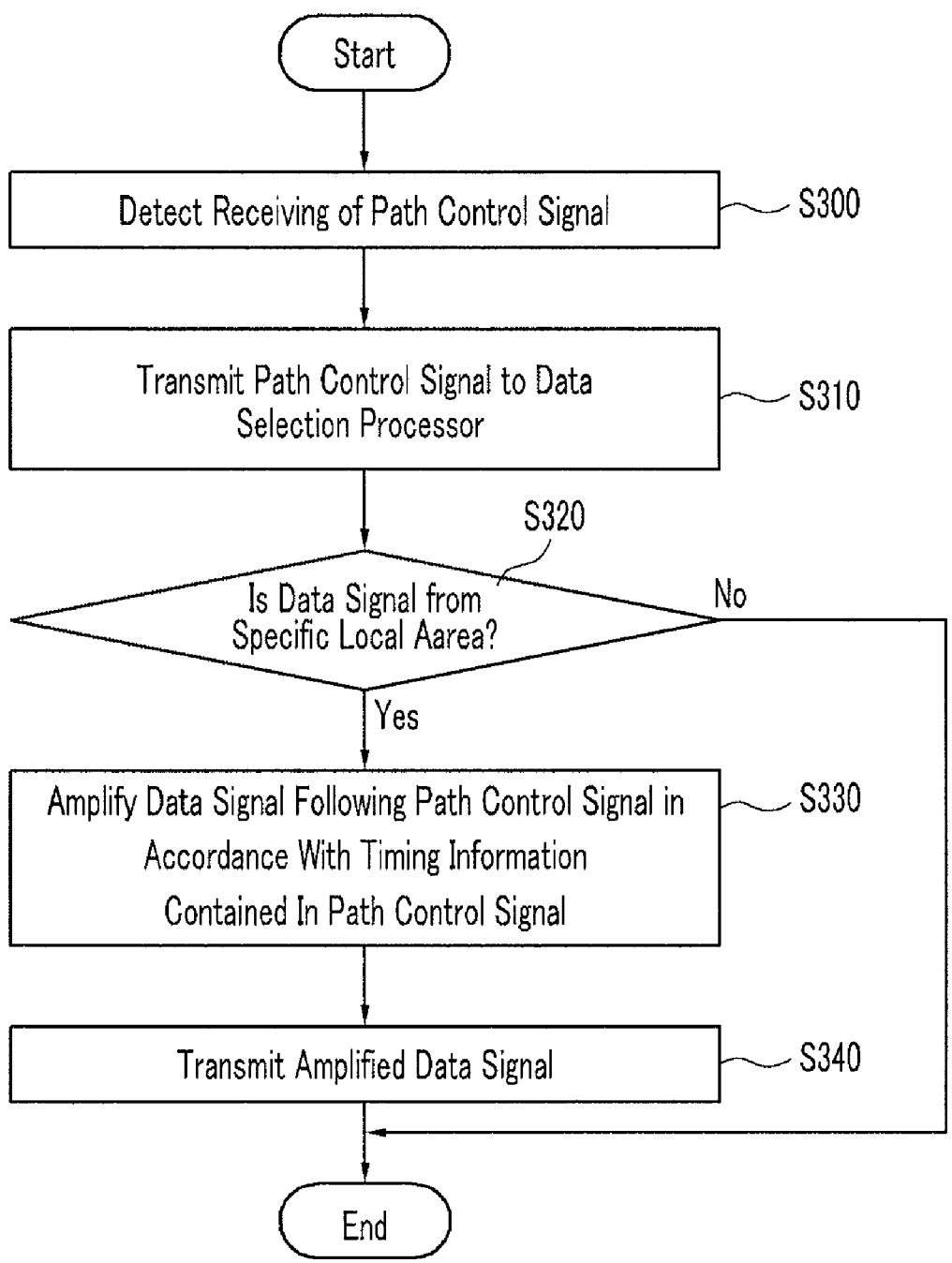
FIG. 6 is a flow chart illustrating a method for selecting and amplifying data in a repeater according to an embodiment of the present invention.
Figure 7A:
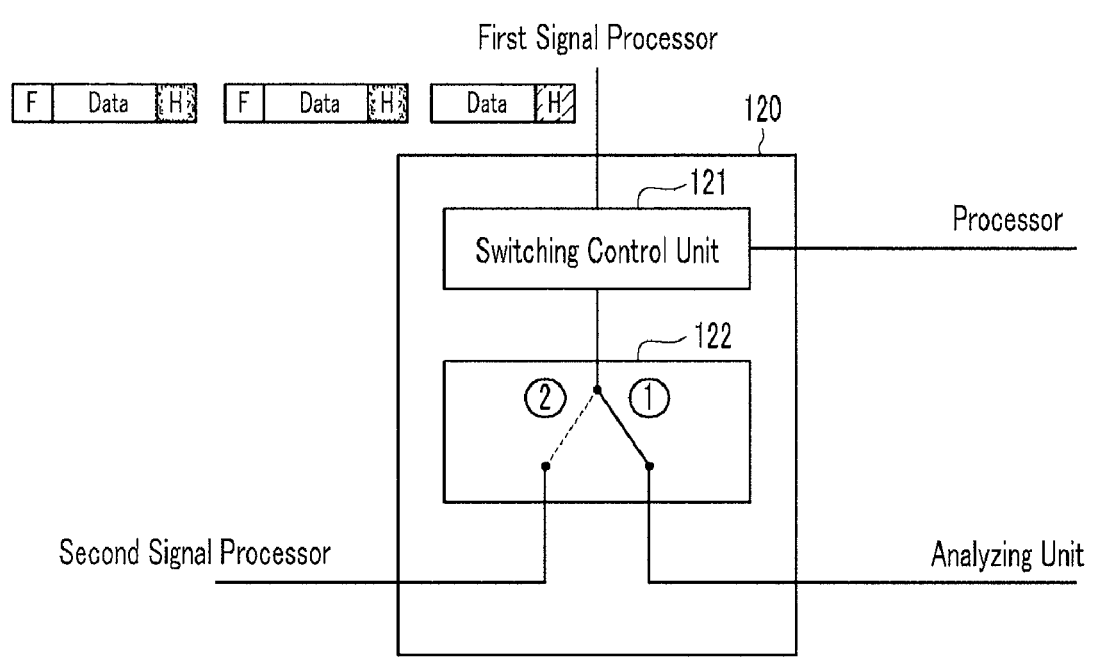
FIGS. 7A and 7B are views illustrating a method of selecting and amplifying the data in the repeater according to an embodiment of the present invention.
Figure 7B:
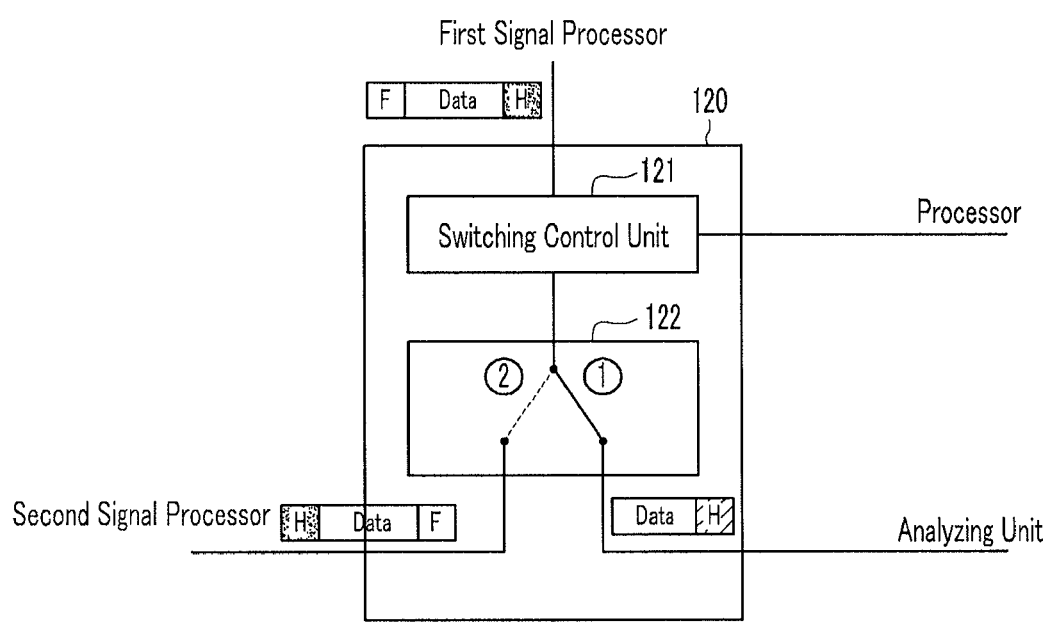

FIG. 6 is a flow chart illustrating a method for selecting and amplifying data in a repeater according to an embodiment of the present invention. FIGS. 7A and 7B are views illustrating a method of selecting and amplifying the data in the repeater according to an embodiment of the present invention. For convenience, FIG. 6 will be described with reference to the repeater of FIG. 2.

First, when the path controller 120 detects the path control signal that is the initial information of the data signal transmitted from the sensor node (S300), the path controller 120 transmits the path control signal to the data selection processor 130 (S310). That is, the path controller 120 opens the first path ① of the switch 122 to set the transmission path of the path control signal as the data selection processor 130.

The data selection processor 130 that received the path control signal determines if the data is from the specific local area (S320). At this point, the data selection processor 130 compares the identification code contained in the path control signal with a preset identification code to determine if the received data is from the specific local area. The data selection processor 130 retrieves the switching turn-on sustain period information in accordance with the timing information code contained in the path control signal.

When it is determined that the received data is from the specific local area, the data signal that is transmitted following the path control signal for a predetermined time is amplified (S330). That is, the data selection processor 130 transmits a control signal for setting the path of the data signal received following the path control signal as an amplification processor (a second process in this embodiment) to the switching control unit 120. At this point, the data signal processor 130 transmits a signal for turning on the second path ② of the switch 122 to the switching control unit 121 in accordance with the switching turn-on sustain period. Accordingly, the predetermined number of data signals received following the path control signal can be amplified. At this point, the data signal received following the path control signal may be one or more frame data signals.

The amplified data signals are transmitted to the sink node (S340).

At this point, when it is determined that the received data is not from the specific local area, the data selection processor 130 quits the data signal relay.

For example, as shown in FIG. 7A, the path control signal is received through the repeater, right after which a plurality of frame data signals (including information data collected by the sensor node of the specific local area) are transmitted to the repeater. At this point, the switching control unit 121 detects the path control signal that is initially received to open the first path ① of the switch 122.

Then, as shown in FIG. 7B, the received path control signal is transmitted to the data selection processor 130 to determine if the data signals following the path control signal are from the specific local area. As described above, when it is determined that the received data signal is from the specific local area, the switching control unit 121 receives the control signal from the data selection processor 130 to open the second path ② of the switch 122. That is, the plurality of data signals received following the path control signal are sequentially transmitted to the second signal processor 140 and amplified.

At this point, the amplification of the data signals following the path control signal and the completion of the data selection process concur almost simultaneously, and thus the transmission delay can be prevented. Further, the selection process for the received data signals is not performed by a single frame unit but a plurality of frames are amplified in real time, thereby effectively realizing the data signal transmission and receiving.

Meanwhile, an embodiment of the present invention describes a method for selecting the data received from the sensor nodes and transmitting the selected data to the sink node after amplifying the same. However, it will be obvious that the method can be applied for the data received from the sink node so that the amplified data can be transmitted to the sensor nodes.

According to an embodiment of the present invention, the data signals can be amplified after determining if the data signals must be amplified by identifying only the initial information of the data signals received from the repeater of the sensor network.

Hence, the transmission delay caused by the data selection can be reduced to prevent the distortion of the data transmitted and received, and thus the data transmission and receiving can be effectively realized.

While embodiments of this invention has been described, it is to be understood that the invention is not limited to the disclosed embodiments, but, on the contrary, is intended to cover various modifications and equivalent arrangements included within the spirit and scope of the appended claims.

What is claimed is:

1. A wireless repeater for relaying data between two nodes of a sensor network, the repeater comprising:
    a first signal processor configured to amplify received data, the received data comprising a leading portion and a subsequent portion subsequent to the leading portion in the data;
    a path controller configured to route the leading portion to a data selection processor and further configured to route the subsequent portion to a second signal processor only in response to a command to route the subsequent portion to the second signal processor received from the data selection processor;
    said path controller comprising a switching controller configured to detect the leading portion comprising source information indicative of a source of the data, and further configured to detect the subsequent portion lacking the source information; a switch configured to switch between the data selection processor and the second signal processor for routing the leading portion and the subsequent portion in accordance with detection by the switching controller
    said second signal processor configured to amplify the subsequent portion for wireless transmission; and
    said data selection processor configured to analyze the leading portion and determine whether the repeater is responsible for retransmitting the received data based on the result of analyzing the leading portion, wherein the data selection processor is further configured to send the command to route the subsequent portion to the second signal processor to the path controller if it is determined that the repeater is responsible for retransmitting the data.

2. The repeater of claim 1, wherein the data selection processor comprises:
    an analyzer configured to identify the source information;
    a processor configured to determine whether the repeater is responsible for retransmitting the data using the source information, and further configured to transmit the command to the path controller; and
    a memory configured to store at least one predetermined legitimate source of data for which the repeater is responsible for retransmitting, wherein the processor is further configured to use the at least one predetermined legitimate source for determining that the repeater is responsible for retransmitting the data.

3. The repeater of claim 2, wherein the switch is configured to route the leading portion to the analyzer, and
    the switch is further configured to route the subsequent portion to the second signal processor.

4. The repeater of claim 3, wherein the data is in the form of a frame and the leading portion is a header of the frame.

5. The repeater of claim 3, wherein the data is in the form of a frame, and the leading portion comprises a path control signal.

6. The repeater of claim 5, wherein the path control signal comprises the source information and information indicative of a length of the subsequent portion.

7. The repeater of claim 6, wherein the router is further configured to route at least one frame of data following the path control signal to the second signal processor.

8. A method of operating a repeater for relaying data between two nodes of a sensor network, the method comprising:
    receiving, by the repeater, data comprising a leading portion and a subsequent portion, the subsequent portion which is received subsequently to the leading portion, wherein the leading portion comprises source information indicative of a source of the data;
    detecting, by the repeater, at least part of the leading portion and the subsequent portion;
    switching, by the repeater, between a data selection processor and a signal processor for routing the leading portion and the subsequent portion in accordance with the detection;
    conducting an analysis, by the data selection processor of the repeater, of the leading portion to determine the source of the data;
    determining, by the repeater, if the received data is received from one of predetermined legitimate sources using the source information determined by the analysis; and
    amplifying and transmitting, by the signal processor of the repeater, the subsequent portion only when it has been it has been determined that the received data is from one of the predetermined legitimate sources.

9. The relaying method of claim 8, wherein the leading portion comprises a header of a frame or a path control signal.

10. The relaying method of claim 9, wherein determining comprises: retrieving the source information contained in the header; and comparing the retrieved source information against information indicative of at least one predetermined legitimate sources, which is stored in the repeater.

11. The relaying method of claim 9, wherein determining comprises: retrieving the source information contained in the path control signal and information indicative of a length of the subsequent portion; and comparing the retrieved source information against information indicative of at least one predetermined legitimate sources, which is stored in the repeater.

12. The relaying method of claim 11, wherein amplifying the subsequent portion is performed for a period sufficient to amplify the length of the subsequent portion.

13. The relaying method of claim 12, wherein the subsequent portion comprises at least one frame.

14. The relaying method of claim 11, wherein the information indicative of a length of the subsequent portion is also contained in the path control signal.

* * * * *